United States Patent [19]

Niki

[11] Patent Number: 5,278,682
[45] Date of Patent: Jan. 11, 1994

[54] METHOD FOR PRODUCING A LIQUID CRYSTAL DISPLAY WITH RECOVERY ELECTRODES UNDER THE SEALANT

[75] Inventor: Kenichi Niki, Amagasaki, Japan

[73] Assignee: Mitsubishi Denki Kabushiki Kaisha, Tokyo, Japan

[21] Appl. No.: 2,254

[22] Filed: Jan. 8, 1993

Related U.S. Application Data

[62] Division of Ser. No. 711,901, Jun. 7, 1991, Pat. No. 5,202,788.

[30] Foreign Application Priority Data

Jun. 8, 1990 [JP] Japan ................................. 2-151252

[51] Int. Cl.⁵ .................. G02F 1/1339; G02F 1/1335; G02F 1/1343
[52] U.S. Cl. ........................................ 359/62; 359/80; 359/54
[58] Field of Search ...................... 359/62, 54, 55, 87, 359/83, 80

[56] References Cited

U.S. PATENT DOCUMENTS

| | | | |
|---|---|---|---|
| 4,394,067 | 7/1985 | Spruiit | 359/80 |
| 4,688,896 | 8/1987 | Castleberry | 359/54 |
| 4,807,973 | 2/1989 | Kawasaki | 359/59 |
| 4,846,459 | 6/1989 | Stronu | 359/87 |
| 5,045,753 | 9/1991 | Katayama | 359/87 |
| 5,062,690 | 11/1991 | Whetton | 359/59 |
| 5,169,693 | 12/1992 | Fujimura | 359/80 |

FOREIGN PATENT DOCUMENTS 64-15990 3/1989 Japan .

OTHER PUBLICATIONS

A 1 Mega-Pixel Color a-Si TFT Liquid-Crystal Display (SID 88 Digest, 232 pp, 1988).

Primary Examiner—William L. Sikes
Assistant Examiner—Kenneth Parker

[57] ABSTRACT

A matrix-addressed type liquid crystal display device includes a display element conductor pattern deposited on a matrix-addressed substrate and effects display by storing charges into liquid crystal held at the space between the matrix-addressed substrate and an opposing substrate by using a voltage supplied through the display element conductor pattern. The matrix-addressed type liquid crystal display device has a recovery conductor pattern for preventing a line-shape defect in a screen due to a breakage in the display element conductor pattern. The recovery electrode is located below the sealing material. The opposing substrate and the matrix-addressed substrate are aligned with each other at one side thereof, and an inlet for liquid crystal is provided at this aligned side. Liquid crystal is fed into the space between the matrix-addressed substrate and the opposing substrate from a liquid crystal reservoir through the inlet without immersing the substrates in the liquid crystal reservoir.

5 Claims, 6 Drawing Sheets

METHOD FOR PRODUCING A LIQUID CRYSTAL DISPLAY WITH RECOVERY ELECTRODES UNDER THE SEALANT

This application is a divisional of copending application Ser. No. 07/711,901, filed on Jun. 7, 1991, now U.S. Pat. No. 5,202,788 the entire contents of which are hereby incorporated by reference.

BACKGROUND OF THE INVENTION

1. Field of the Invention

This invention relates to a matrix-addressed type liquid crystal display device such as a liquid crystal television or a liquid crystal display for use in a laptop personal computer.

2. Description of the Related Art

With the progress of information-oriented society, a rapid advancement has been made in the field of matrix-addressed type display devices such as a liquid crystal display and the like.

FIG. 8 of the accompanying drawings shows a driver circuit of a conventional liquid crystal display. In FIG. 8, reference numerals $X_1$ to $X_m$ designate a plurality of column line data electrodes, to which a data voltage is applied from a data output circuit 1, spaced from each other in parallel; and $Y_1$ to $Y_n$ designate a plurality of row line scanning electrodes, to which a scanning voltage is applied from a scanner circuit 2, spaced from each other in parallel. A thin film transistor (hereinafter called TFT) is formed at each intersection of a column line pattern of the data electrodes $X_1$ to $X_m$ with a row line pattern of the scanning electrodes $Y_1$ to $Y_n$. A gate electrode 4 of a TFT 3 formed along an i-th line, where i represents an integer from 1 to n, is electrically conducted to a row line scanning electrode Yi. A source electrode 5 of the TFT 3 formed along a j-th line, where j represents an integer from 1 to m, is electrically conducted to a column line data electrode Xj. To a drain electrode 6 is a pixel electrode 7 electrically conducted. At a position confronting to the pixel electrode 7 is an opposing electrode 8 formed, and liquid crystal 9 is sandwiched between the opposing electrode 8 and the pixel electrode 7.

The liquid crystal display device having the foregoing structure is driven in sequence as described below. Initially, the scanner circuit 2 outputs a scanning voltage to one of the scanning electrodes $Y_1$ to $Y_n$, so that the scanning voltage is applied to gate electrodes of all TFTs positioned in the same row to turn the TFTs 3 on. In synchronization with the application of the scanning voltage to any row, the data output circuit 1 supplies a data voltage to every pixel by way of the data electrodes $X_1$ to $X_m$, and this video signal voltage is then transferred to one pixel electrode 7 only by way of the TFT 3 whose gate is being applied with the scanning voltage. When the application of the scanning voltage shifts to a subsequent row, the TFT 3 having been activated is turned off and electric charges are then stored in liquid crystal 9 of that TFT 3. Thus, displaying is effected on that liquid crystal 9.

However, in the case of the driver circuit having the above-described configuration for used in the liquid crystal display, a breakage of the pattern in either the scanning electrodes $Y_1$ to $Y_n$ or the data electrodes $X_1$ to $X_m$ results in the interruption of the voltage transfer at a broken spot and hindering a further transmission of the voltage. In result, a line-shape defect develops on the display screen composed of liquid crystals 9 arranged in the matrix. A method of recovering from such a line defect on the liquid crystal display is disclosed in Japanese Patent Laid-Open Publication No. 15990/1989.

FIG. 9 is a wiring diagram showing a liquid crystal display disclosed in the above-described Japanese publication. In FIG. 9, a rectangular area, surrounded by dotted lines and having corners specified with A, B, C and D, is composed of a plurality of display elements, that is, pixels and serves as a display area on which an image is produced. Z designates a conductor pattern pair which is subdivided into four fractional pairs $Z_1$, $Z_2$, $Z_3$, $Z_4$ and is arranged so as to enclose the outermost periphery of the display area with the corners A, B, C and D and serves for restoring a broken pattern. This recovery conductor pattern pair intersects with the data electrodes $X_1$ to $X_m$, and the scanning electrodes $Y_1$ to $Y_n$ via a non-illustrated dielectric layer. This recovery conductor pattern pair Z has bonding pads 21 for interconnecting spatially pattern fractional pairs $Z_1$ through $Z_4$ with each other. 22 designates a wire bonding pattern for interconnecting the recovery conductor pattern pair Z with either a row line of the scanning electrodes $Y_1$ to $Y_n$ or a column line of the data electrodes $X_1$ to $X_m$; and 22b, a wire bonding pattern for interconnecting together the fractional recovery conductor pattern pairs $Z_1$ through $Z_4$ spaced from each other.

A pattern breakage recovery according to a conventional method will be described with the assumption that the row line scanning electrode $Y_1$ has a breakage at a spot designated by X. In such a case, as shown in FIG. 9, if the row line scanning electrode $Y_1$ is connected to both the fractional recovery conductor pattern pairs $Z_1$ and $Z_2$, respectively, by means of the wire bonding 22, and also if these fractional recovery conductor pattern pairs $Z_1$ and $Z_2$ are interconnected with each other by means of a wire bonding wiring 22b, an alternate conductive path of the broken row line electrode $Y_1$ is made. By this alternate conductive path, the voltage can be transmitted further from the broken spot, thereby restoring the pattern defect.

FIG. 10 is a cross-sectional plan view of the liquid crystal panel taken along the row line scanning electrode $Y_1$ of FIG. 9 at the corner B, where 20 designates a matrix-addressed substrate; 22, an opposing substrate; 23, a liquid crystal layer; and 27, sealing material.

Since the conventional matrix-addressed liquid crystal device having the above structure, the matrix-addressed substrate 20 projects from edges of the opposing substrate 22 with respect to the display area, i.e., top, bottom, left and right sides as shown in FIG. 10. Accordingly, in order to feed liquid crystal into a cell, a reservoir 30 for storing liquid crystal must have a depth exceeding the length of the projecting portions of the matrix-addressed substrate 20 as illustrated, which resulted in increasing the amount of expensive liquid crystal to be used. Moreover, since all of the projecting portions of the matrix-addressed substrate 20 are immersed into liquid crystal layer 31 in the liquid crystal reservoir, the liquid crystal 31 is contaminated by impurities existing on the surface of the matrix-addressed substrate 20, namely, deterioration in a resistivity of the liquid crystal is caused, thereby disadvantageously shortening the estimated usable period of the liquid crystal 31. Since the liquid crystal to be used in the liquid crystal display is expensive, it is impossible to reduce the cost of the matrix-addressed type liquid crystal device.

SUMMARY OF THE INVENTION

It is therefore an object of this invention to provide an inexpensive matrix-addressed liquid crystal display device by improving a yield of the matrix-addressed liquid crystal device and reducing the consumption of the liquid crystal.

According to a first aspect of the invention, there is provided a matrix-addressed liquid crystal display device comprising: a matrix-addressing substrate having a dielectric property; an opposing substrate placed on the matrix-addressed substrate parallel to the same and having at least one edge thereof aligned with one of the edge of the matrix-addressed substrate when viewed from right above the matrix-addressed substrate; sealing material applied to the outer periphery of the opposing substrate and the sealing material for attaching the opposing substrate to the matrix-addressed substrate to hermetically seal the edges of the opposing substrate except a given portion along the edge that is aligned with the edge of the matrix-addressed substrate; and liquid crystal sandwiched between the matrix-addressed substrate and the opposing substrate.

Specifically, there is provided an improved matrix-addressed type liquid crystal display device having matrix-addressed substrate and an opposing substrate both of which are attached together at a given space therebetween with one edge thereof aligned with each other. The edge not hermetically sealed serves as an inlet of liquid crystal.

With this structure, there is no necessity of the deep and vast liquid crystal reservoir used in the conventional method to feed or infuse liquid crystal into space between the matrix-addressed substrate and the opposing substrate. Namely, there is only needed a liquid crystal reservoir having depth sufficient for immersing the inlet into the liquid crystal. Accordingly, the amount of liquid crystal to be wasted in fabrication is decreased as well as the deterioration in quality of the liquid crystal due to the immersing of the pair of the matrix-addressed substrate and the opposing substrate is abated.

Even if a display element conductor pattern and a recovery conductor pattern pair are provided in addition to the above structure, these two electrodes can be separated each other by interposing a dielectric layer therebetween. More in detail, if the display element conductor pattern is composed of a plurality of data electrodes spaced from each other in parallel at a given distance and a plurality of scanning electrodes spaced from each other in parallel at a given distance, insulation can be surely effected between the data electrodes and the scanning electrodes, between the data electrodes and the recovery electrodes, and between the scanning electrodes and the recovery electrodes by interposing the dielectric layer. In such a structure, the intersection of each column line data electrode with each row line scanning electrode defines a display element.

Given that the display element conductor pattern and the recovery conductor pattern are deposited, it becomes possible to correct a line-shape screen defect due to the breakage of the display element conductor pattern by electrically interconnecting the display element conductor pattern with the recovery conductor pattern to form an alternate conductive path for voltage supply. Fabricating at least either the display element conductor pattern or the recovery conductor pattern from material separable by the irradiation of light beam having a predetermined intensity facilitates the realization of the aforementioned conductive connection.

Moreover, the recovery electrodes should preferably be positioned around the liquid crystal to form the alternate conductive path between the recovery conductor pattern and the display element conductor pattern. For this purpose, the recovery conductor pattern should be placed at the position to be sealed by means of sealing material, for instance. By the adoption of such structure, the liquid crystal would not hinder the path of the light beam when interconnecting between the recovery conductor pattern and the display element conductor pattern by the irradiation of light beam.

Since a data voltage and a scanning voltage are supplied to the data electrodes and the scanning electrodes, respectively, a data voltage input pad and a scanning voltage input pad should preferably be provided with the liquid crystal display device. In the case of a liquid crystal display device having the structure mentioned above, only a single display element which locates at the intersection of the row line scanning electrode to which the scanning voltage is being supplied with column line data electrode to which the data voltage is being supplied can effect display in response to the applied voltage.

According to a second aspect of the invention, there is provided a method of manufacturing a matrix-addressed type liquid crystal device, comprising steps as described below. This method is particularly suitable for fabricating the matrix-addressed type liquid crystal display device being set forth above.

In a first step, an opposing substrate is placed on a matrix-addressed substrate in such a position as to be parallel to the matrix-addressed substrate and with one edge thereof aligned with a edge of the matrix-addressed substrate.

In a second step, sealing material is applied to around the periphery of the opposing substrate, and the opposing substrate is attached to the matrix-addressed substrate. The periphery of the opposing substrate is sealed by the sealing material in such a manner that an inlet is formed at a predetermined position along the edge of the opposing substrate which is aligned with the edge of the matrix-addressed substrate.

In a third step, liquid crystal is infused into the space between matrix-addressed substrate and the opposing substrate by way of the inlet.

Through the above-described steps, the matrix-addressed type liquid crystal display device having the foregoing structure will be fabricated.

Before feeding the liquid crystal into the space between the matrix-addressed substrate and the opposing substrate through the inlet, it would be better to fill the liquid crystal reservoir with the liquid crystal.

This method further comprise a step of immersing the inlet portion into the liquid crystal reservoir filled with the liquid crystal and a step of infusing the liquid crystal into the space between the matrix-addressed substrate and the opposing substrate via the inlet.

When the liquid crystal reservoir is filled with the liquid crystal so that the liquid crystal stand up from the brim of the reservoir because of the surface tension, the area of the inlet to be immersed into the liquid crystal stored in the reservoir is decreased, thereby reducing the size of the liquid crystal reservoir and preventing the deterioration in quality of the liquid crystal.

If the liquid crystal is fed from a single liquid crystal reservoir into a plurality of pairs of the matrix-addressed substrate and the opposing substrate through each inlet thereof, it becomes possible to simplify at least one step of the manufacturing processes of the matrix-addressed type liquid crystal display device by simultaneously handling a plurality of semi-finished products, thereby shortening the manufacturing period and improving the efficiency in fabrication.

The above and other advantages, features and additional objects of this invention will be manifested to those versed in the art upon making reference to the following detailed description and the accompanying drawings in which a preferred embodiment incorporating the principles of this invention is shown by way of illustrative example.

DETAILED DESCRIPTION

Figure 1:
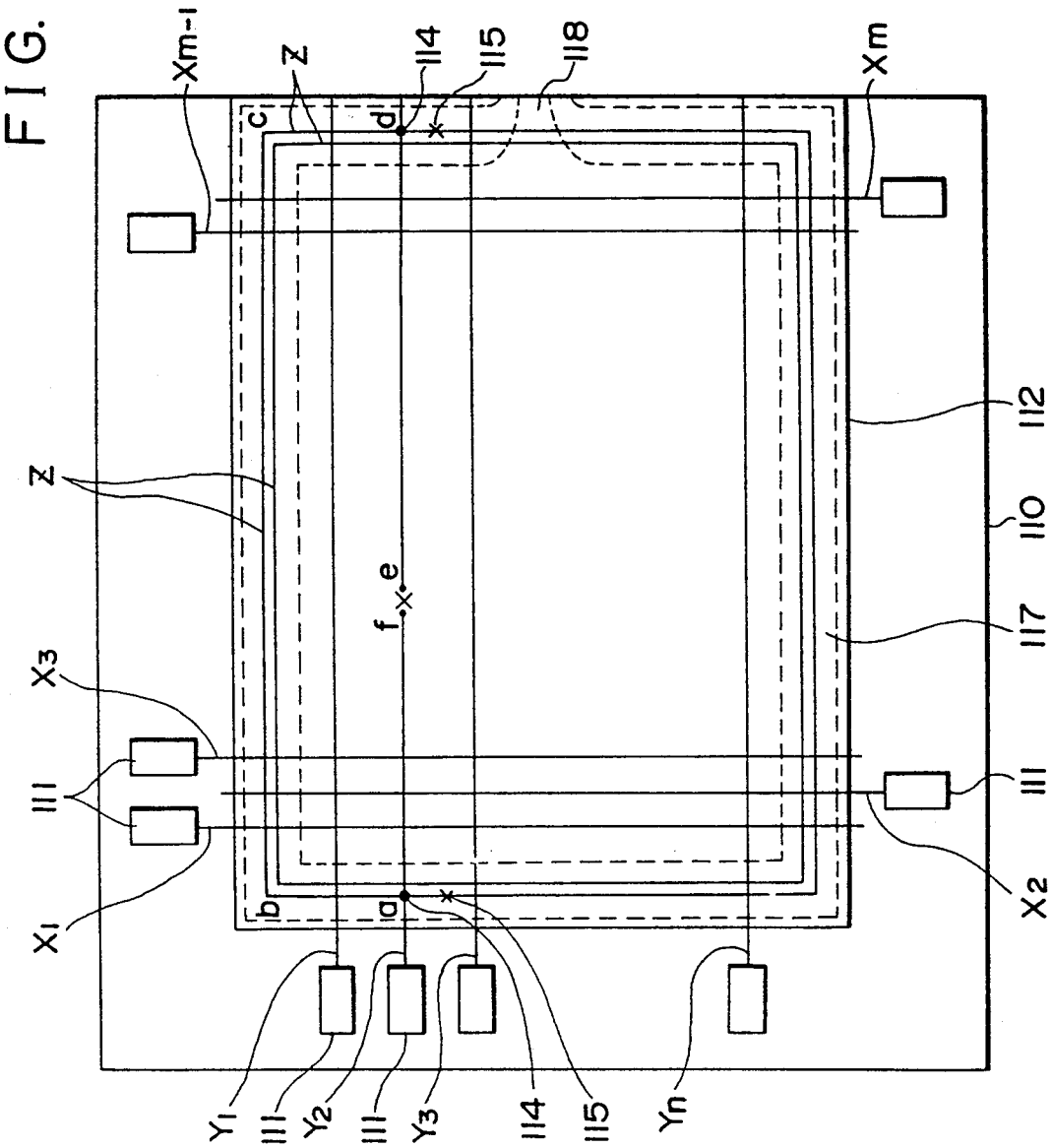
FIG. 1 is a plan view showing a matrix-addressed type liquid crystal display device according to one embodiment of this invention.
Figure 2:
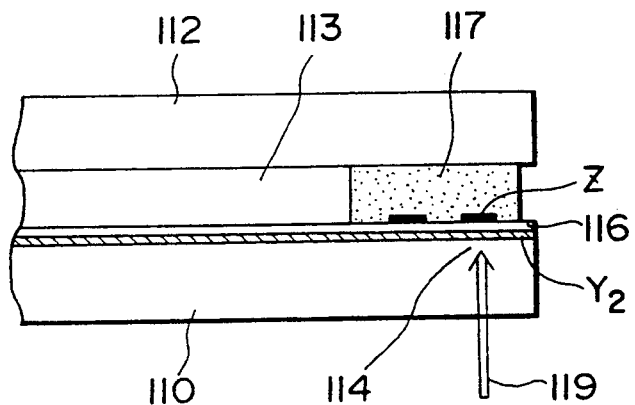
FIG. 2 is a fragmentary cross-sectional view of FIG. 1.
Figure 3:
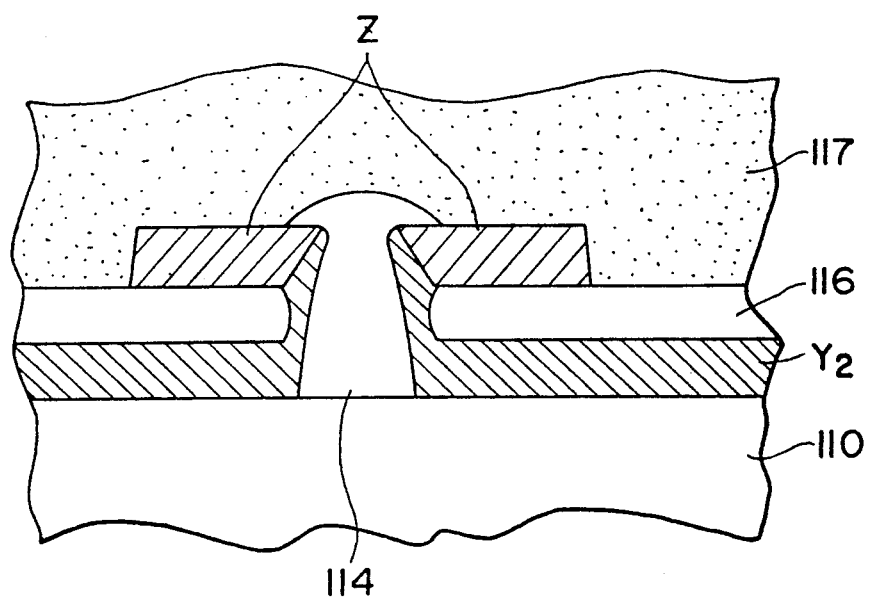
FIG. 3 is an enlarged fragmentary cross-sectional view of FIG. 1.

A matrix-addressed type liquid crystal display device according to one embodiment of this invention will now be explained with reference to the accompanying drawings. FIG. 1 is a wiring diagram of the matrix-addressed type liquid crystal display device embodying this invention. FIG. 2 is a fragmentary cross-sectional view of the device of FIG. 1 at the time of laser connection; and FIG. 3 is a fragmentary cross-sectional view of the device of FIG. 1 after the laser connection.

In these drawings, $X_1$ to $X_m$ designate aluminum electrodes (Al) formed on a dielectric matrix-addressed substrate 110 with the thickness of about 1000 to 2000 Å. These electrodes serve as data electrodes to which a data voltage is applied, and are positioned parallel to each other. $Y_1$ to $Y_n$ designate electrodes composed of chrome (Cr) with the thickness of about 1000 to 2000 Å. These electrodes serve as scanning electrodes to which a scanning voltage is applied, and are positioned parallel to each other. The scanning electrodes $Y_1$ to $Y_n$ intersect with the data electrodes $X_1$ to $X_m$ via a dielectric layer 116 (FIG. 2). Z designates a conductor pattern pair which is composed of aluminum with the thickness of 1000 through 2000 Å and forms a closed circuit enclosing the outer periphery of a display portion. In this embodiment, the conductor pattern pair Z is of uniformly integrated conductor path without bonding pads. This conductor pattern pair is called as a recovery conductor pattern pair, and intersects with the data electrodes $X_1$ to $X_m$ and the scanning electrodes $Y_1$ to $Y_n$ via the dielectric layer 116 composed of silicon nitride (SiNx) having the thickness of about 2000 to 3000 Å as shown in FIG. 2. 111 designates a data input pad provided at one end of each column line of the data electrodes $X_1$ to $X_m$ and each row line of the scanning electrodes $Y_1$ to $Y_n$. 114 designates a conductive junction, at which the recovery conductor pattern pair Z intersects with either the data electrodes $X_1$ to $X_m$ or the scanning electrodes $Y_1$ to $Y_n$ at both ends thereof, electrically interconnected by a YAG laser beam 119 or the like. 115 designates a separated portion at which the recovery conductor pattern Z is disconnected by the irradiation of YAG laser.

112 designates an opposing substrate; 113, a liquid crystal layer sandwiched between the matrix-addressed substrate 110 and the opposing substrate 112; 117, sealing material made from epoxy resin for bonding together the matrix-addressed substrate 110 and the opposing substrate 112; opening of the sealing material 117 serving as an inlet of liquid crystal. The recovery electrode Z is patterned inside the sealing material 117 placed around the matrix-addressed substrate 110. The matrix-addressed substrate 110 is attached to the opposing substrate 112 with the edge thereof aligned with each other where the inlet is provided.

In the liquid crystal display device having above structure, if an electrode pattern is broken at a spot "e-f" FIG. 1 on a row line scanning electrode $Y_2$, this pattern breakage will be recovered with the steps described below. First, by irradiating YAG laser light 119 having the spot size of about 5 to 10 μm at intersections of the broken row line Y with one of the recovery conductor pattern pair Z as shown in FIG. 2, the interconnected junction 114 will have a form as illustrated in FIG. 3, thereby electrically conducting between the row line scanning electrode $Y_2$ and the conductor pattern of the recovery conductor pattern pair Z. As the same manner of making the electrical interconnection of the broken row line scanning electrode $Y_2$ by utilizing one of the recovery conductor pattern pair Z, by the continuous irradiation of YAG laser light 119 having the spot size of about 5 to 10 μm at a spot 115 which locates in the vicinity of interconnected junction 114 of the row line scanning electrode $Y_1$ and distant from the intersection of a pattern of the recovery conductor pattern pair Z with that row line of the scanning electrodes $Y_1$ to $Y_n$, the conductor pattern of the recovery conductor pattern pair Z that is connected with the broken row line scanning electrode is disconnected, thereby completing the alternate conductive path of the broken scanning electrode line $Y_2$.

Figure 8:
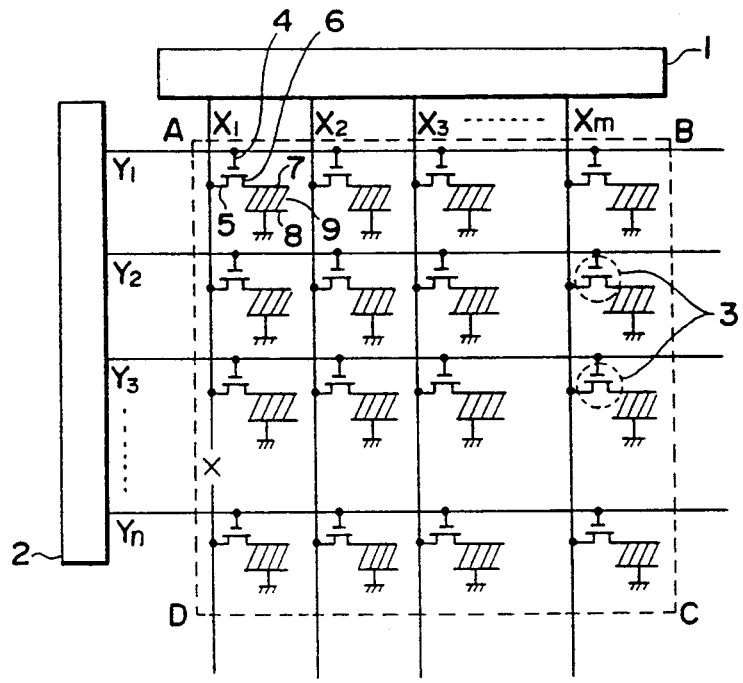
FIG. 8 is a circuit diagram showing a conventional matrix-addressed type liquid crystal display device.
Figure 9:
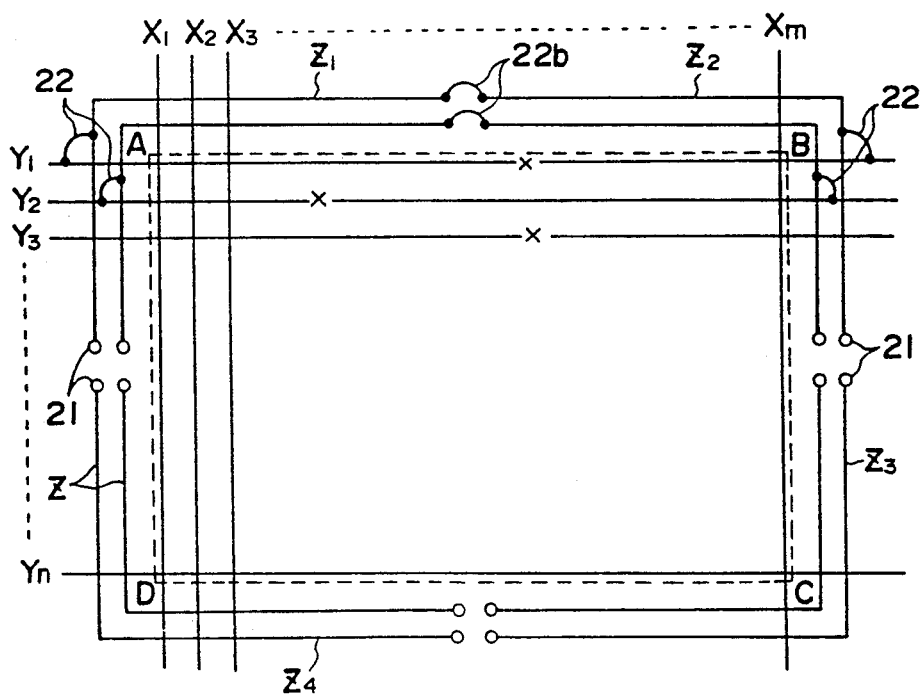
FIG. 9 is a plan view of FIG. 8.
Figure 10:
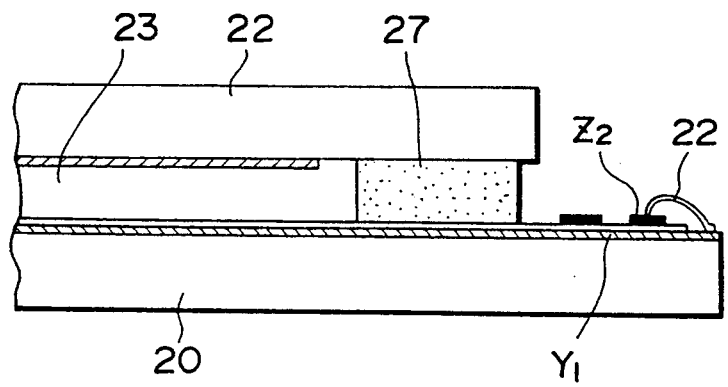
FIG. 10 is a fragmentary cross-sectional view of FIG. 8.
Figure 11:
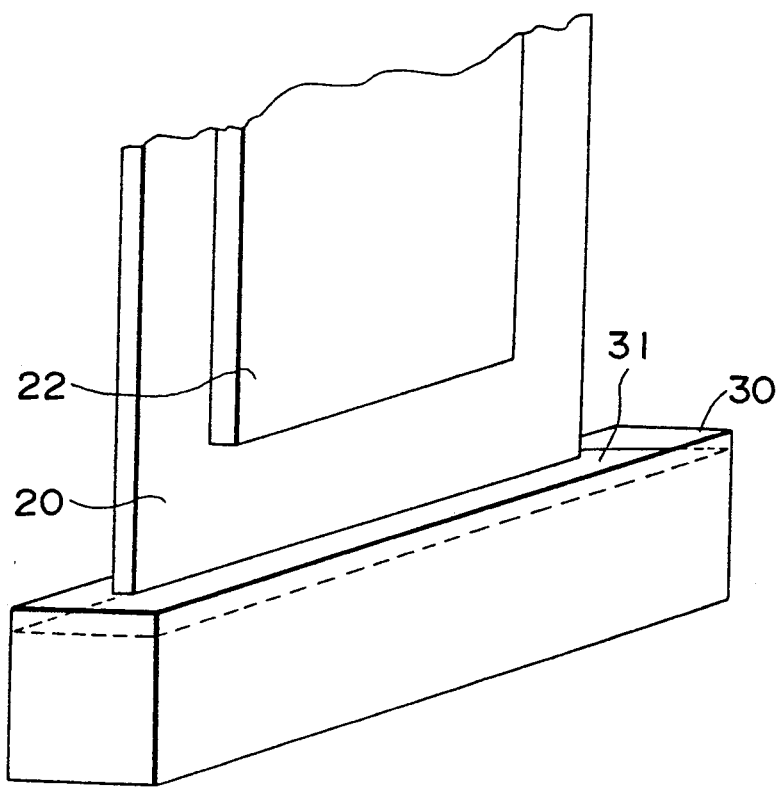
FIG. 11 is a fragmentary perspective view showing part of a conventional method of manufacturing the matrix-addressed type liquid crystal display device.

The liquid crystal display device having the above structure uses the same driver circuit of FIG. 8 as used in the conventional liquid crystal display device, and the driver circuit operates in the line sequence as does in the conventional device.

As a result, two electrical conductive paths, that is a→b→c→d→e, and a→f are formed by the use of one path of the recovery conductor pattern pair Z, and a voltage input from the data input pad 111 which is connected to the broken scanning electrode $Y_2$ is further supplied from the broken spot so that the line-shape defect in the liquid crystal display device can be eliminated.

Figure 4:
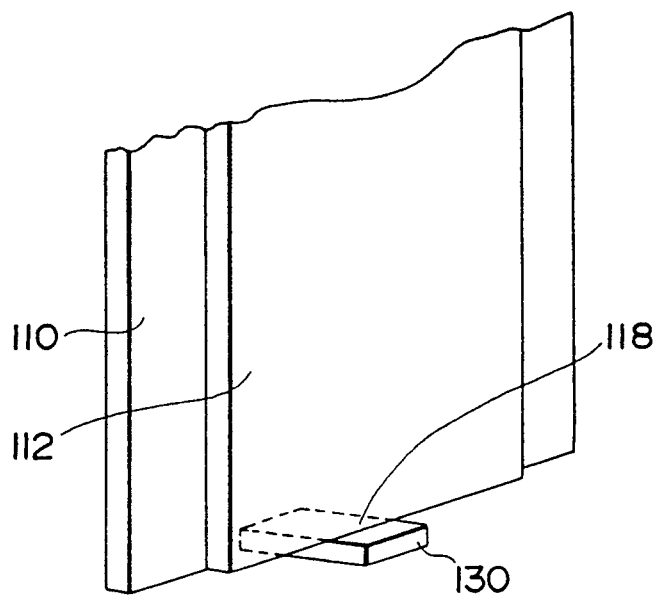
FIG. 4 is a fragmentary perspective view showing part of a manufacturing method embodying the invention.
Figure 5:
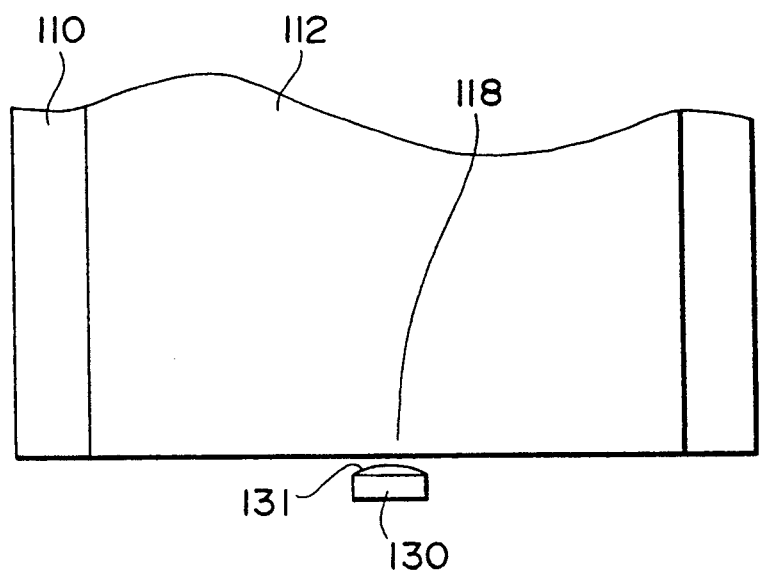
FIG. 5 is a fragmentary from elevational view showing part of the manufacturing method.
Figure 6:
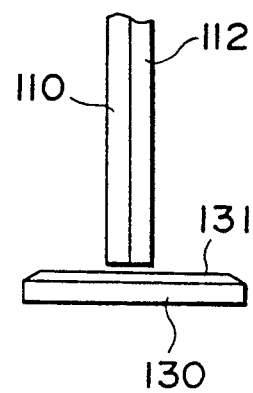
FIG. 6 is a fragmentary side elevational view showing part of the manufacturing method.

The filling technique of the liquid crystal embodying this invention will be described with reference to FIGS. 4 through 6.

One edge of the matrix-addressed substrate 110 is aligned with a counterpart edge of the opposing substrate 112 at an inlet 118, and the liquid crystal 131 is filled in the liquid crystal reservoir 130 in such a manner that the liquid crystal can stand up from the brim of the reservoir 130. By immersing the inlet 118 into the liquid crystal 131 which standing up, the liquid crystal 131 is fed into the space between the matrix-addressed substrate 110 and the opposing substrate 112. For this purpose, a small size reservoir is sufficient as the liquid crystal reservoir, and it becomes possible to reduce nominal the surface area of the matrix-addressed substrate 110 and the opposing substrate 112 to be immersed into the liquid crystal 131, thereby saving the consumption of the liquid crystal 131 and preventing the deterioration in quality of the liquid crystal 131 due to contamination little or nothing.

Figure 7:
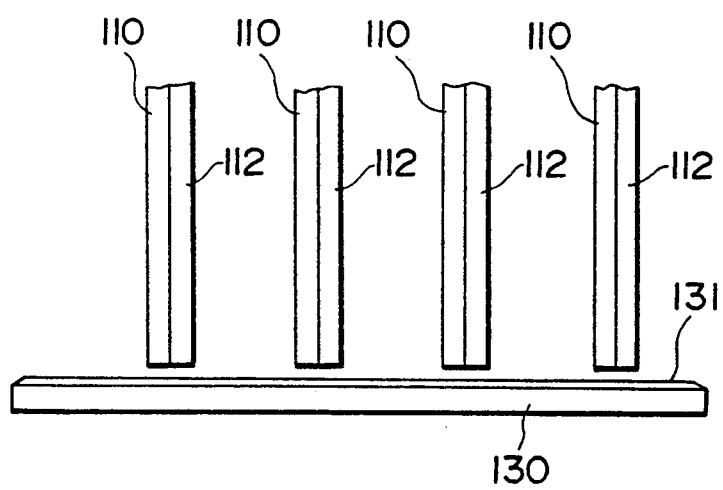
FIG. 7 is another fragmentary side elevational view showing part of the manufacturing method.

In this invention, the liquid crystal 131 is poured into the space of the pair of the matrix-addressed substrate and the opposing substrate 112. Alternatively, the liquid crystal may be fed into a plurality of pairs at one time as shown in FIG. 7. In this particular case, the amount of the expensive liquid crystal to be used can be saved, which reduces the costs of the liquid crystal display device.

As described above, according to this invention, since the recovery electrode pair for restoring the line-shape defects due to the pattern breakage is placed inside the sealing material applied around the display area in such a manner as to intersect with the display element conductor pattern via the dielectric layer and to align one edge of the matrix-addressed substrate with a counterpart edge of the opposing substrate having the inlet, it becomes possible to reduce the consumption of the liquid crystal with a high yield maintained by preventing the line-shape defects due to the pattern breakage. Therefore, the manufacturing method embodying this invention provides a matrix-addressed type liquid crystal display device with high yield and the reduction in cost.

What is claimed is:

1. A method of manufacturing a matrix-addressed type liquid crystal display device, comprising the steps of:

(a) forming a display element conductor pattern on a matrix addressed substrate, said display element conductor pattern being composed of a plurality of data electrodes spaced from each other in parallel and plurality of scanning electrodes spaced from each other in parallel and positioned at a right angle relative to said data electrodes;

(b) forming a dielectric layer over said matrix addressed substrate, said dielectric layer being adapted to effect insulation between said data electrodes and said scanning electrodes and between said data electrodes and a recovery conductor pattern;

(c) placing an opposing substrate on said matrix addressed substrate parallel to each other with at least one side thereof aligned with one counterpart side of said matrix-addressed substrate as viewed from right above said matrix-addressed substrate;

(d) placing said recovery conductor pattern on said matrix addressed substrate to cross said display element conductor pattern at a right angle and located in a peripheral region to be covered by a sealing material;

(e) attaching said opposing substrate to said matrix-addressed substrate by applying said sealing material to said peripheral region of said substrates, thereby sealing said peripheral region of said substrates except an inlet provided at a given position along said side aligned with said counterpart side of said matrix-addressed substrate; and (f) filling liquid crystal into a space between said matrix-addressed substrate and said opposing substrate through said inlet without immersing said substrates in said liquid crystal.

2. A method according to claim 1, wherein said liquid crystal is filled in a liquid crystal reservoir previously, and said filled liquid crystal is then poured into the space between said matrix-addressed substrate and said opposing substrate through said inlet.

3. A method according to claim 2, wherein said liquid crystal is filled in said liquid crystal reservoir so as to stand up from the brim of said liquid crystal reservoir due to surface tension.

4. A method according to claim 8, wherein said liquid crystal is poured from a single liquid crystal reservoir into a plurality of pairs of said matrix-addressed substrate and said opposing substrate through each inlet thereof.

5. A method according to claim 4, wherein said liquid crystal is filled into said liquid crystal reservoir so as to stand up from the brim of said liquid crystal reservoir due to surface tension.

* * * * *